United States Patent
Herman et al.

(10) Patent No.: US 9,996,975 B2
(45) Date of Patent: Jun. 12, 2018

(54) INTERACTIVE MULTI-RIDER VIRTUAL REALITY RIDE SYSTEM

(71) Applicant: DreamWorks Animation LLC, Glendale, CA (US)

(72) Inventors: Brad Kenneth Herman, Culver City, CA (US); Shiraz Akmal, Glendale, CA (US); Paul Kurzawa, Glendale, CA (US)

(73) Assignee: DreamWorks Animation L.L.C., Universal City, CA (US)

( * ) Notice: Subject to any disclaimer, the term of this patent is extended or adjusted under 35 U.S.C. 154(b) by 0 days. days.

(21) Appl. No.: 14/660,831

(22) Filed: Mar. 17, 2015

(65) Prior Publication Data

US 2015/0269780 A1    Sep. 24, 2015

Related U.S. Application Data

(60) Provisional application No. 61/955,154, filed on Mar. 18, 2014.

(51) Int. Cl.

| G06F 3/01 | (2006.01) |
|---|---|
| G06T 19/00 | (2011.01) |
| G06F 3/0481 | (2013.01) |
| G02B 27/01 | (2006.01) |
| G06T 13/00 | (2011.01) |

(Continued)

(52) U.S. Cl.
CPC .......... *G06T 19/006* (2013.01); *A63F 13/211* (2014.09); *A63F 13/26* (2014.09); *G02B 27/017* (2013.01); *G06F 3/012* (2013.01); *G06F 3/017* (2013.01); *G06F 3/04815* (2013.01); *G06T 13/00* (2013.01); *A63F 2300/8082* (2013.01); *G02B 2027/0141* (2013.01); *G02B 2027/0187* (2013.01); *G06T 2207/10016* (2013.01); *G06T 2215/16* (2013.01); *G06T 2219/024* (2013.01)

(58) Field of Classification Search
None
See application file for complete search history.

(56) References Cited

U.S. PATENT DOCUMENTS 6,007,338 A * 12/1999 DiNunzio ................ G09B 9/02
                                                     345/672
6,179,619 B1 * 1/2001 Tanaka ..................... A63G 7/00
                                                     434/307 R (Continued)

OTHER PUBLICATIONS

Extended European Search Report received for European Patent Application No. 15159588.1, dated Jul. 24, 2015, 10 pages.

(Continued)

*Primary Examiner* — Ryan M Gray
(74) *Attorney, Agent, or Firm* — Dentons US LLP

(57) ABSTRACT

A virtual reality ride system includes a platform having at least one seat, a first headset, a second headset, and one or more rendering processors. The first and second headsets each have a motion-sensing unit and a display unit configured to display animated video. The one or more processors are configured to render a first animated video of a virtual environment from a perspective based on the physical location and orientation of the first headset, and to render a second animated video of the virtual environment from a perspective based on the physical location and orientation of the second headset.

23 Claims, 12 Drawing Sheets

(51) Int. Cl.
*A63F 13/26* (2014.01)
*A63F 13/211* (2014.01)

(56) References Cited

U.S. PATENT DOCUMENTS

| | | | | |
|---|---|---|---|---|
| 2006/0178221 A1* | 8/2006 | Threlkel | ............... | A63G 7/00 |
| | | | | 472/1 |
| 2009/0202114 A1* | 8/2009 | Morin | .................... | A63F 13/12 |
| | | | | 382/118 |
| 2010/0240454 A1* | 9/2010 | Xiao | ..................... | A63G 21/20 |
| | | | | 463/30 |
| 2012/0264510 A1* | 10/2012 | Wigdor | ................. | A63F 13/10 |
| | | | | 463/31 |
| 2013/0012327 A1* | 1/2013 | Schreibfeder | ......... | A63G 31/16 |
| | | | | 472/2 |
| 2013/0083173 A1 | 4/2013 | Geisner et al. | | |

OTHER PUBLICATIONS

Dodds et al., "Embodied Interaction in Immersive Virtual Environments with Real Time Self-Animated Avatars", ACM Classification Keywords, May 7-12, 2011, 4 pages.

Fodakahn, "Oculus VR Rift Coaster Motion Simulator!" You Tube, Dec. 5, 2013, 1 page.

Salzmann et al., "The Two-User Seating Buck: Enabling Face-to-Face Discussions of Novel Car Interface Concepts", IEEE Virtual Reality, Mar. 8-12, 2008, pp. 75-82.

Zheng, Long, "Ford Australia launches Virtual Reality Centre", available online at <http://www.istartedsomething.com/20120829/ford-australia-launches-virtual-reality-centre/, Aug. 29, 2012, pp. 1-5.

Office Action received for European Patent Application No. 15159588.1, dated Dec. 22, 2016, 10 pages.

\* cited by examiner

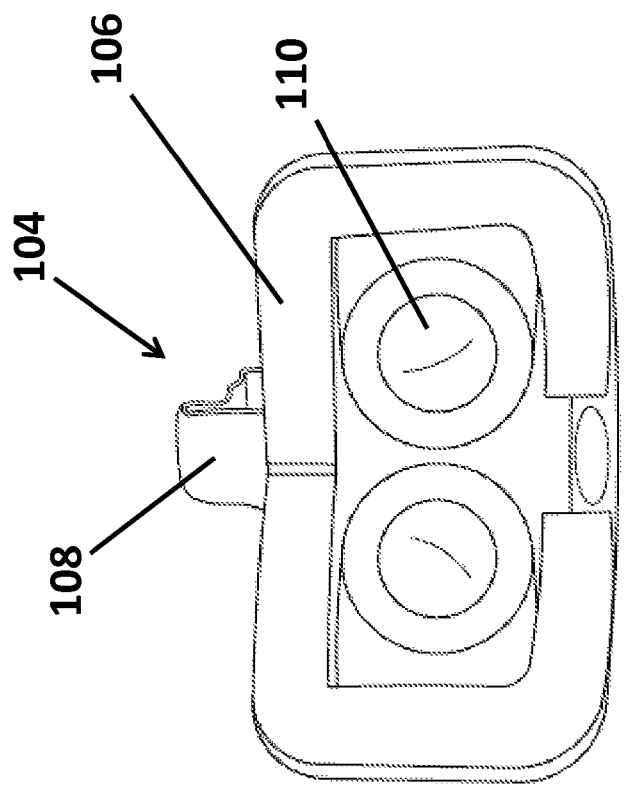
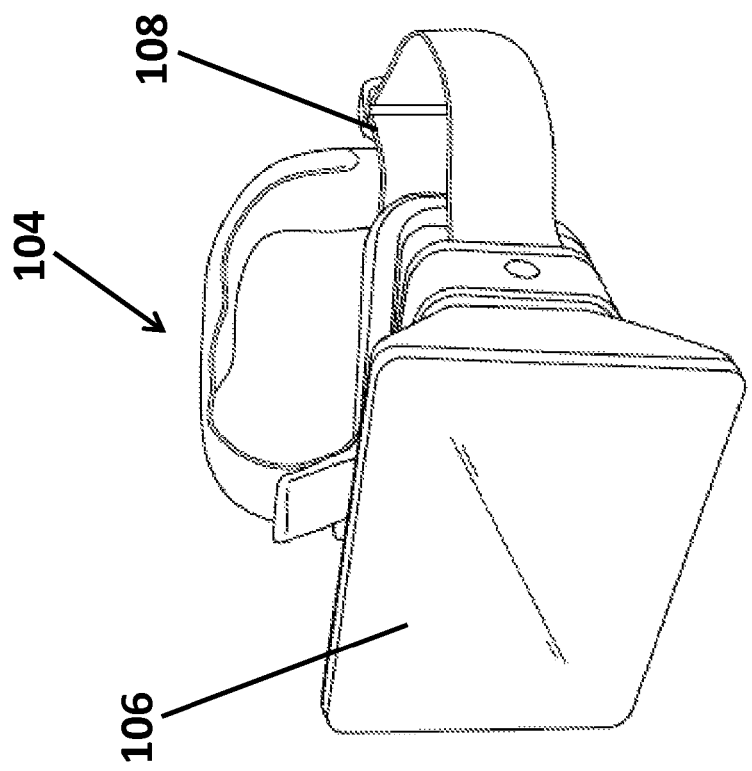

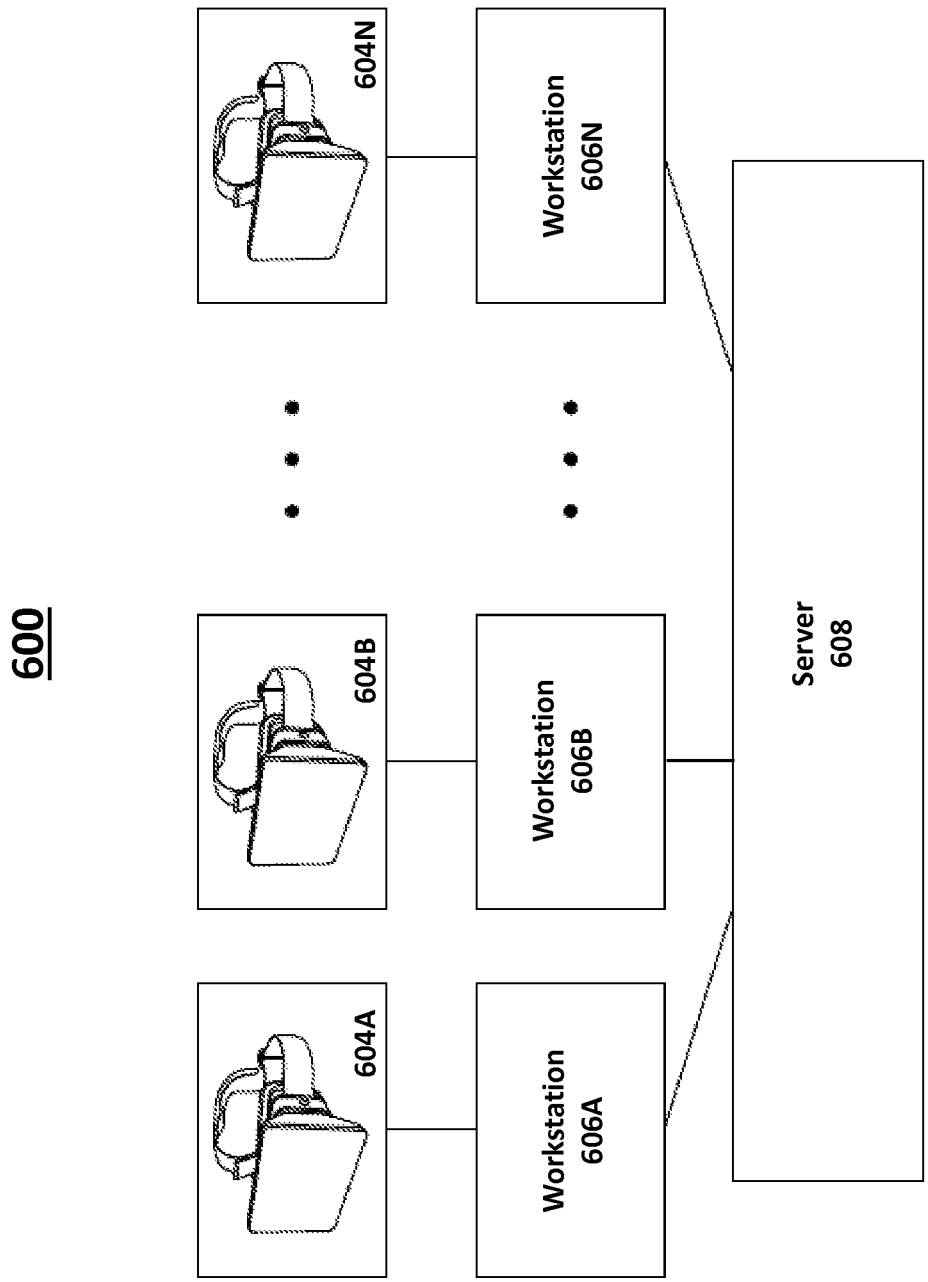

INTERACTIVE MULTI-RIDER VIRTUAL REALITY RIDE SYSTEM

CROSS-REFERENCE TO RELATED APPLICATIONS

This application claims the benefit of U.S. Provisional Patent Application Ser. No. 61/955,154, filed on Mar. 18, 2014, which is hereby incorporated by reference in its entirety.

BACKGROUND

1. Field

This application relates generally to virtual reality ride systems, and, more specifically, to a system in which multiple riders in physical proximity to each other each experiences a virtual ride in a common virtual environment and is provided an individual perspective of the virtual environment.

2. Description of the Related Art

Virtual reality is a computer-simulated environment that can simulate a user's physical presence in real or imaginary environments. A virtual reality environment typically includes visual images displayed either on a computer screen or through stereoscopic (e.g., 3D) displays. The virtual reality environment may also include sound provided through speakers or headphones and force feedback via, for example, a dynamic platform or a vibrating controller or joystick. Applications of virtual reality include medical, gaming, and military environments.

Virtual reality environments involving multiple users typically consist of individuals in remote locations controlling virtual representations of themselves in the virtual environment. In a multi-player online game, for example, each player sits at his own computer and moves within the virtual space through the use of a keyboard, mouse, joystick, or other input device. Some games may allow remote interaction among players via text or voice communication. As such, the players interact solely in the virtual space and through remote communication. Furthermore, the virtual environment is not affected by either the actual or relative physical locations of the players.

SUMMARY

The present disclosure describes a virtual reality ride system that provides an improved virtual reality experience in which multiple riders share common physical and virtual spaces that mirror each other. The shared virtual space is affected by each rider's location and movement in the physical space such that multiple riders can interact and communicate in both the physical and local spaces at the same time.

According to the virtual reality ride system described herein, each rider of the system has a virtual representation in the virtual environment. Each rider's position in the virtual environment corresponds to the rider's position in the shared physical space, relative to the positions of the other riders.

Riders are provided with individual displays showing visual images of the same virtual environment. However, each rider is shown a different perspective based on that rider's position in the virtual environment. Riders are also provided with sensors that track their physical position. A rider may alter his position in the virtual space by moving in physical space. He may also see the position and movement of other riders in the virtual environment. Since riders can move themselves and see movement of others in the virtual space, they can interact with each other in the virtual space while also interacting in the shared physical space.

DESCRIPTION OF THE FIGURES

FIGS. 2A-2B depict an exemplary virtual reality headset.

FIG. 6 depicts a block diagram of an embodiment of a virtual reality ride system.

The embodiments depicted in the figures are only exemplary. One skilled in the art will readily recognize from the following discussion that alternative embodiments of the structures and methods illustrated herein can be employed without departing from the principles described herein.

DETAILED DESCRIPTION

The following description sets forth specific configurations, parameters, and the like. It should be recognized, however, that such description is not intended as limiting the present disclosure, but is instead provided as a description of exemplary embodiments.

Figure 1:
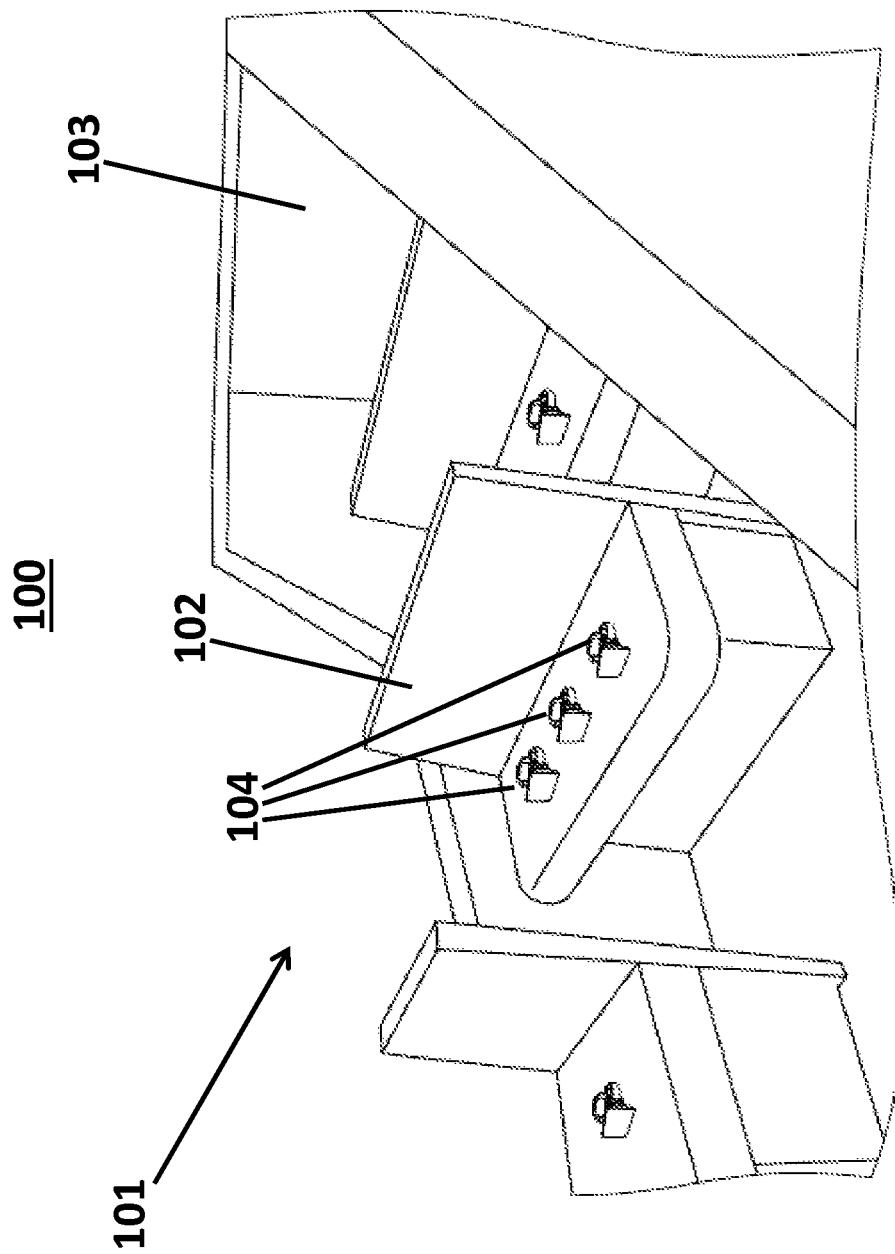
FIG. 1 depicts an exemplary embodiment of a virtual reality ride system.

FIG. 1 depicts an embodiment of a virtual reality ride system 100 in physical space 101. Virtual reality ride system 100 includes seats 102 and virtual reality headsets 104. The seats 102 are mounted on a platform 103, which may include walls, doors, windows, lights, or other features to create a surrounding structure. The structure may be associated with the type of virtual reality ride the passengers will experience.

To ride the virtual reality ride system 100, each rider sits on seat 102 and wears a headset 104 on his head. Each headset 104 displays a video image of a virtual environment to the rider. FIGS. 2A-2B depict an enlarged view of an exemplary virtual reality headset 104. The headset 104 includes a display/sensor portion 106 and straps 108 to secure the headset 104 to the rider's head. The display/sensor portion 106 includes a display unit that generates a two-dimensional or three-dimensional representation of the virtual environment. The virtual environment may be displayed by projecting an image onto a miniaturized screen in the headset 104. In some embodiments, the display unit may include a CRT, LEDs, LCDs, or the like. Optics may be used to manipulate and condition the light from the display to be presented to the rider. As seen in FIG. 2B, for example, the headset includes binocular optics 110 for viewing the display.

The headset 104 may also include a motion-sensing unit that includes sensors, such as, for example, gyroscopes, accelerometers, or the like, to detect and track movement of the rider's head in physical space 101. The headset 104 may track translational movement in one, two, or three dimensions. The headset 104 may also track rotation about one, two, or three axes. By tracking translational and rotational motion, the position of the rider's head may be determined. For the purposes of this disclosure, position information may include location (e.g., linear position, such as the coordinates of an object along the x, y, and z axes of a rectilinear reference frame) and/or orientation (e.g., angular position, attitude, or the heading, elevation, and bank of an object relative to a fixed reference frame). The headset 104 may also include means for recalibration. For example, a magnetometer may be included to correct drift in gyroscopes used in the headset 104.

Each headset 104 provides a rider with a video image from an individual perspective of the virtual environment. Each rider has a location and orientation in the virtual environment (i.e., a virtual location and virtual orientation). The virtual location may be based on the rider's physical location in physical space 101. Similarly, the virtual orientation may be based on the rider's physical orientation. The rider may be shown a view of the virtual environment from his virtual location and in the direction of his virtual orientation. As a rider physically rotates his head, the motion sensors in headset 104 may detect the movement and alter the rider's view of the virtual environment from his virtual location. For example, when a rider turns his head to the right, the headset displays an image of the virtual environment to the right of the rider's virtual location in the virtual environment. The rider may "look around" the virtual environment simply by moving his head the same way as he would in the physical space 101, without the need for a separate controller or input device to change the angle of the imagery. In embodiments that include sensors to detect and track translational movement, the rider may also move to different locations within the virtual environment by moving around the platform 103 of the virtual reality ride system 100, thereby changing the origin of his virtual perspective.

The video of the virtual environment may be provided to the headsets 104 by a computer processor. The processor may receive position data from the headset 104 and provide a video signal to the headset 104 based on the position data received. In some embodiments, the processor provides animated video images to the headset 104. In such embodiments, based on the virtual position of the rider, the processor renders animated video content of the virtual environment from the rider's virtual location and in the direction in which the rider is looking.

Referring again to FIG. 1, the virtual reality ride system 100 includes a seat 102 on which the rider may sit while experiencing the virtual environment through the headset 104. The seat 102 may be dynamic in order to provide physical sensations associated with the visual events occurring in the virtual environment seen by the rider. For example, the seat 102 may move by vibrating, rotating, translating, or the like, in order to add to the virtual experience. In one embodiment, the rider may be shown a virtual environment in which he is riding in a car over a bumpy road. The seat 102 may vibrate or shake to simulate the forces that one would feel due to the bumps in the road.

In addition, virtual reality ride system 100 may provide audio to accompany the visual imagery of the headset 104 and the motion of the dynamic seat 102. In some embodiments, surround sound speakers may be located around the periphery of the platform 103 so that all riders hear the same audio. It is preferable to have the audio source separated from the headsets 104 so that the audio does not have to be adjusted based on the position of the rider. Furthermore, by sharing a common audio source, all the riders may experience a particular sound as coming from the same location, regardless of where each rider is physically located or which way he is facing. A common audio system also allows riders to move around in the platform 103, which would not be possible if the individual sound systems were, for example, built into the seats.

By linking a rider's virtual position to his physical position and providing an individual view of a virtual environment, the virtual reality ride system 100 allows multiple riders in the shared physical space 101 to affect a common virtual environment and to interact with each other in that virtual environment. An example of how riders may interact with each other while experiencing a common virtual environment will now be described in detail with reference to FIGS. 3A-5C.

Figure 3A:
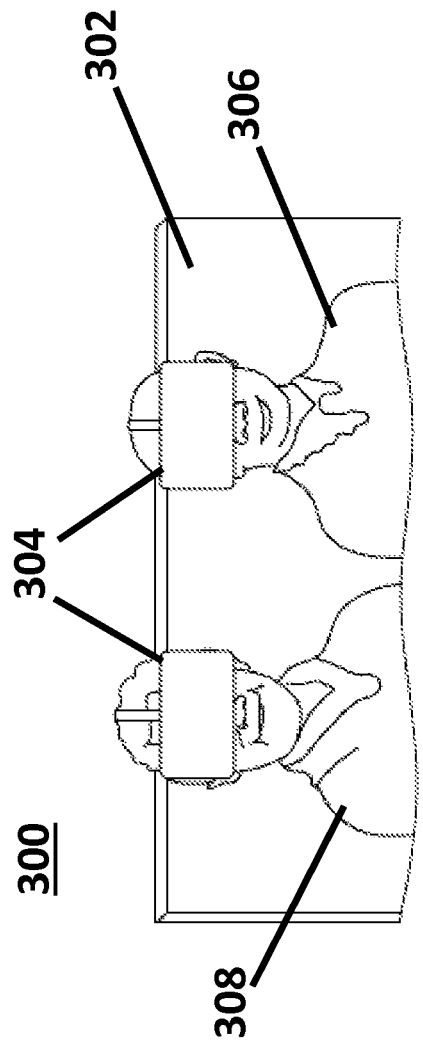
FIG. 3A depicts two riders in a first physical position using the virtual reality ride system.

FIG. 3A depicts a front view of two riders using virtual reality ride system 300. Rider A 306 and Rider B 308 sit next to each other facing forward on a dynamic bench 302. They wear virtual reality headsets 304, which display to each rider his own individual perspective of a common virtual environment.

Prior to starting the ride, the ride system 300 may be initialized to associate an initial physical location with each headset 304 in the physical space and to establish a common forward direction in both the physical and virtual environments. In some embodiments, the initial physical location of a headset determines an initial virtual location of a corresponding rider in the virtual environment. A common forward direction is established so that the riders are provided with a forward-facing view of the virtual environment when oriented in the forward direction in the physical space.

In the following example, the riders experience a virtual ride in the front seats of a car. FIG. 3B depicts an exemplary view of the virtual environment seen by Rider A 306 once the ride has begun. The location of Rider A 306 in the virtual environment is determined by his physical position relative to Rider B 308. Since Rider A 306 is physically sitting on Rider B's left side, as shown in FIG. 3A, Rider A 306 sees a first-person perspective of the virtual environment from the driver's seat of the car. Furthermore, since Rider A 306 is facing forward in the physical space, he is looking out the front windshield of the car.

Figure 3C:
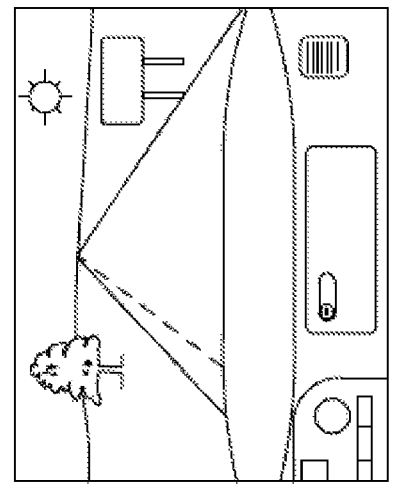
FIG. 3C depicts an exemplary virtual view seen by the other rider corresponding to the first physical position of the two riders shown in FIG. 3A.
Figure 3B:
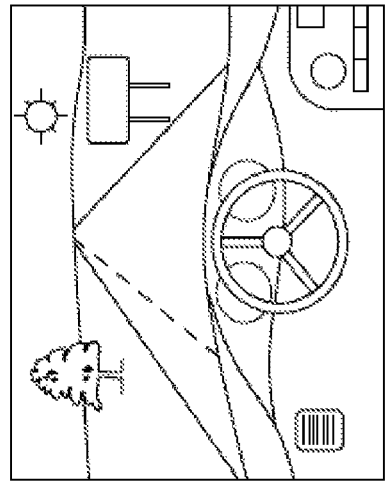
FIG. 3B depicts an exemplary virtual view seen by one of the riders corresponding to the first physical position of the two riders shown in FIG. 3A.

FIG. 3C depicts an exemplary view of the virtual environment seen by Rider B 308 who sees the virtual environment from his own first-person perspective. Since Rider B 308 is physically located on Rider A's right side, Rider B 308 sees the virtual environment from the front passenger seat of the car. Since his head is also physically facing forward, he too sees a view of the virtual environment looking out through the front windshield.

Accordingly, FIGS. 3A-3C illustrate that the riders' locations and perspectives in the virtual world correspond to their individual physical locations and head orientations in the physical space.

Figure 4A:
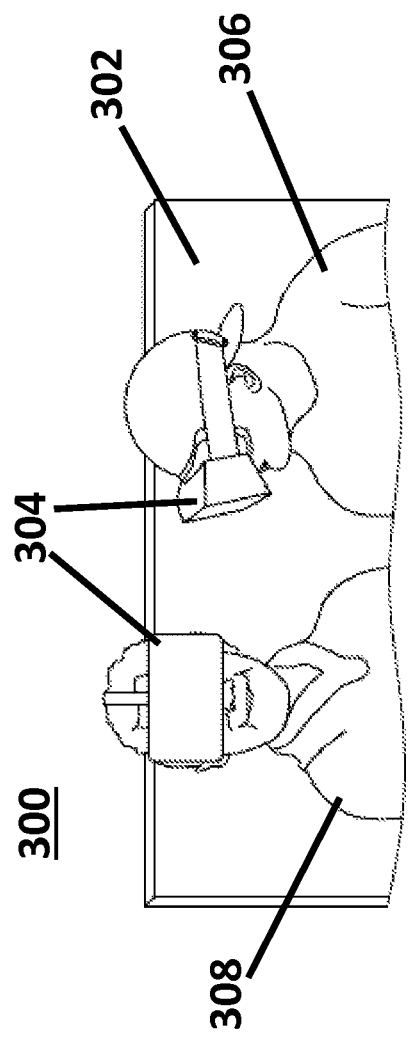
FIG. 4A depicts the riders positioned in a second physical position using the virtual reality ride system.
Figure 4C:
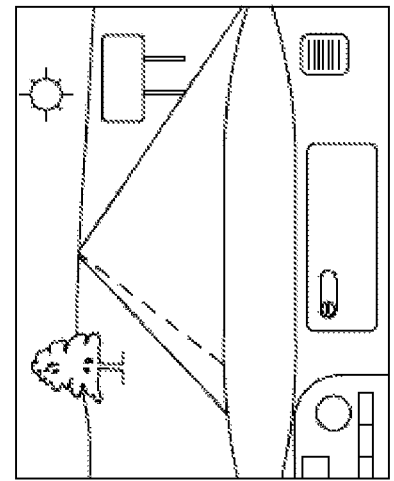
FIG. 4C depicts an exemplary virtual view seen by the other rider corresponding to the second physical position of the two riders shown in FIG. 4A.
Figure 4B:
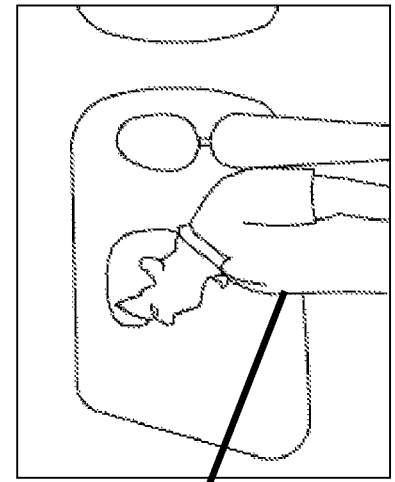
FIG. 4B depicts an exemplary virtual view seen by one of the riders corresponding to the second physical position of the two riders shown in FIG. 4A.

Turning to FIGS. 4A-4C, the ability of a rider to change his look angle in the virtual environment will now be described. FIG. 4A depicts another front view of Rider A 306 and Rider B 308 using the virtual reality ride system 300. In FIG. 4A, however, Rider A's head is turned to his right such that his head is facing Rider B 308.

FIG. 4B depicts an exemplary view of the virtual environment seen by Rider A 306 corresponding to the positions of the two riders shown in FIG. 4A. In FIG. 4A, Rider A 306 is physically facing Rider B 308. Therefore, in the virtual environment, Rider A 306 sees a perspective looking to the right from the driver's seat of the car towards the passenger seat. Since Rider B 308 is also using the virtual reality ride system, there is a graphical representation 308V (e.g., an avatar) in the virtual environment associated with Rider B. The virtual position of graphical representation 308V of Rider B 308 in the virtual environment corresponds to Rider B's position relative to Rider A 306 in the physical space. Thus, by looking towards the passenger seat, Rider A 306 sees the graphical representation 308V of Rider B 308 sitting next to him in the passenger seat.

Furthermore, since Rider B 308 is still facing forward in the physical space, as shown in FIG. 4A, Rider A 306 sees that Rider B's graphical representation 308V is facing towards the front windshield of the car. Accordingly, by turning his head, Rider A 306 changes the direction in which he looks in the virtual environment. Rider A 306 can also tell from Rider B's graphical representation 308V that Rider B 308 is physically facing forward.

FIG. 4C depicts an exemplary view of the virtual environment seen by Rider B 308 corresponding to the positions of the two riders shown in FIG. 4A. Notably, since Rider B 308 has not physically moved (i.e., he is still sitting to Rider A's right and his head is still facing forward), his view of the virtual environment has not changed from that shown in FIG. 3C.

Figure 5A:
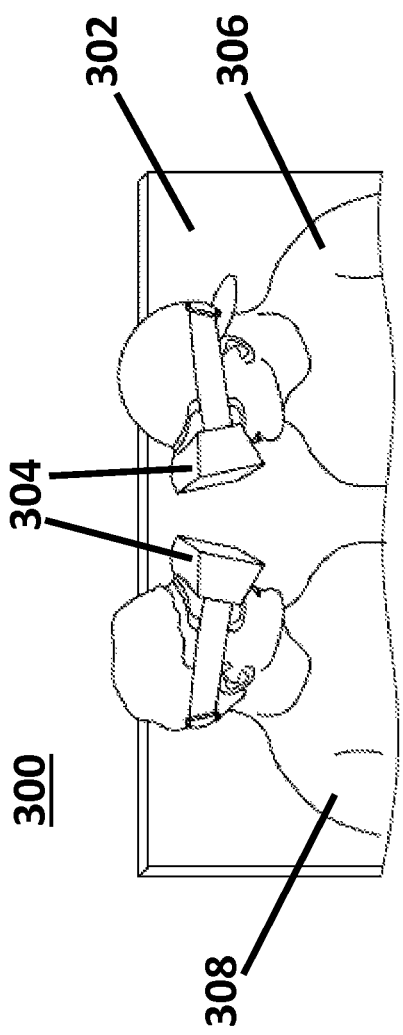
FIG. 5A depicts the riders positioned in a third physical position using the virtual reality ride system.
Figure 5C:
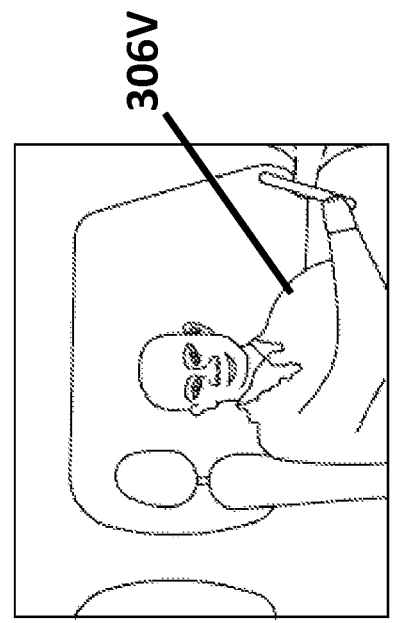
FIG. 5C depicts an exemplary virtual view seen by the other rider corresponding to the third physical position of the two riders shown in FIG. 5A.
Figure 5B:
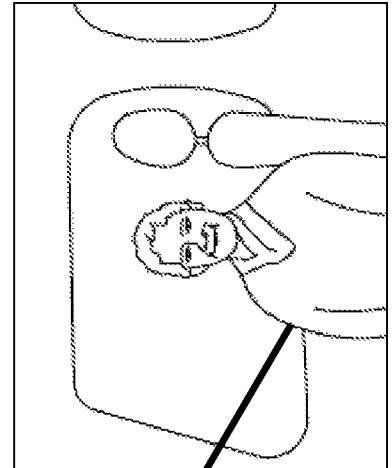
FIG. 5B depicts an exemplary virtual view seen by one of the riders corresponding to the third physical position of the two riders shown in FIG. 5A.

Turning to FIGS. 5A-5C, the ability of a rider to affect the virtual environment will now be described. FIG. 5A depicts another front view of Riders A 306 and B 308 using the virtual reality ride system 300. In FIG. 5A, Rider A's head is turned to his right as in FIG. 4A, but Rider B's head is now turned to face Rider A 306.

FIG. 5B depicts an exemplary view of the virtual environment seen by Rider A 306 corresponding to the positions of the two riders shown in FIG. 5A. Since Rider A 306 has not moved from his position shown in FIG. 4A, Rider A 306 still sees a perspective looking to the right from the driver's seat of the car, including the graphical representation 308V of Rider B 308. However, now that Rider B 308 has turned his head toward Rider A 306, Rider A 306 sees that the representation 308V of Rider B 308 is facing him. Accordingly, by turning his head in the physical world, Rider B 308 has affected the virtual environment seen by Rider A 306.

FIG. 5C depicts an exemplary view of the virtual environment seen by Rider B 308 corresponding to the positions of the two riders shown in FIG. 5A. Since Rider B 308 has physically turned his head toward Rider A 306, Rider B 308 now sees a perspective view looking to the left from the passenger's seat of the car towards the driver's seat. Accordingly, Rider B 308 sees a graphical representation 306V of Rider A 306 in the driver's seat. Furthermore, Rider B 308 sees that Rider A's representation 306V is facing towards him in the virtual environment, just as he is in the physical space.

It should be recognized that although the views seen by each rider in the example above have been described with respect to discrete states of the riders' heads, the rider's head position may be updated continually. Preferably, the position is updated at a rate high enough to minimize discontinuity or blurring of the image and to accurately represent the view the rider would expect to see as he moves his head. Also, it should be recognized that objects and scenery in the virtual environment may be shown to approach and move past the riders over time to give them the effect that the car is moving.

FIGS. 3A-5C illustrate how each rider can see the other's movements in the virtual environment. Seeing each other's movements may allow Rider A 306 and Rider B 308 to interact and communicate in the virtual environments via their movements in the physical space. Also, since the riders are sitting next to each other, they can speak to each other without the need for remote communication. However, because the riders are wearing headsets, they cannot physically see each other. Some riders may find it awkward to talk to someone without being able to tell whether they are looking at them. The system accounts for this by allowing riders to look at graphical representations of each other while they are talking in the real physical space, which provides a more natural way of communicating. Thus, riders can communicate and interact in a manner more similar to the way in which they would in the physical space, while also experiencing a virtual environment.

In addition to head motion, in some embodiments, the system may include sensors to track physical gestures of the rider, such as, for example, hand movements, which may provide yet another means of communicating in the virtual environment and increase similarity with natural communication.

It should also be recognized that although the virtual reality ride system illustrated in FIGS. 3A-5C is described as being used by only two riders, the system may be configured for an arbitrary number of riders, each using their own headset and all sharing a common physical space and a common virtual space.

Furthermore, the system is not limited to any particular virtual environment. For example, riders may share a virtual experience in which they take a ride on Santa's sleigh to the North Pole, fly on the back of an imaginary creature through the sky, ride a jeep through a safari, or other real or imaginary virtual ride experience. The system is also not limited to any specific virtual representation of the riders. Riders may be represented in the virtual space as, for example, elves, animals, robots, or some other real or fictional character. Also, different riders may be represented by different characters. In one embodiment, individual characteristics of a rider, such as, for example, eye shape and color, skin color, hair style and color, height, weight, build, or the like, may be used to create a realistic representation of the rider in the virtual environment Turning now to FIG. 6, an exemplary architecture of a virtual reality ride system 600 is described. In particular, FIG. 6 depicts a block diagram of an embodiment of the virtual reality ride system 600 including headsets 604, workstations 606, and server 608. As shown, each headset 604 is connected to a workstation 606, and each workstation 606 is connected to the server 608. Accordingly, the headsets 604 are networked together through the server 608 via workstations 606.

In one embodiment, the headsets 604 communicate physical location and orientation data to the server 608 via the workstations 606. The workstations 606 receive information from the server 608 indicating virtual positions of graphical representations associated with the other headsets 604. The server 608 may also provide data related to elements or events in the virtual environment (e.g., scenery, character motion, or the like) and/or characteristics of the graphical representations.

As mentioned above, the image displayed to the rider may be animated video of a virtual environment. The workstations 606 may include a processor for rendering animated video or content. Each workstation 606 renders a view of the virtual environment based on the virtual position associated with its corresponding headset 604 (which is based on the physical position of the headset 604 in the physical space). Each workstation 606 also uses the virtual position information associated with other headsets 604 in the network to properly render graphical representations associated with the other headsets 604.

For example, a workstation associated with the headset worn by Rider A 306 in FIGS. 3A-5C described above must know where Rider B 308 is located and the direction in which Rider B 308 is facing in the virtual environment in order to properly render the graphical representation associated with Rider B 308. Accordingly, each workstation 606 renders a view unique to its associated headset 604 while also accounting for the positions of other headsets. In some embodiments, the workstations 606 are slaved together by server 608 so that events in the virtual environments occur at the same time for all riders. Whether or not a rider actually views an event, however, depends on whether the rider is looking in the direction of the event at the time of its occurrence.

Figure 7:
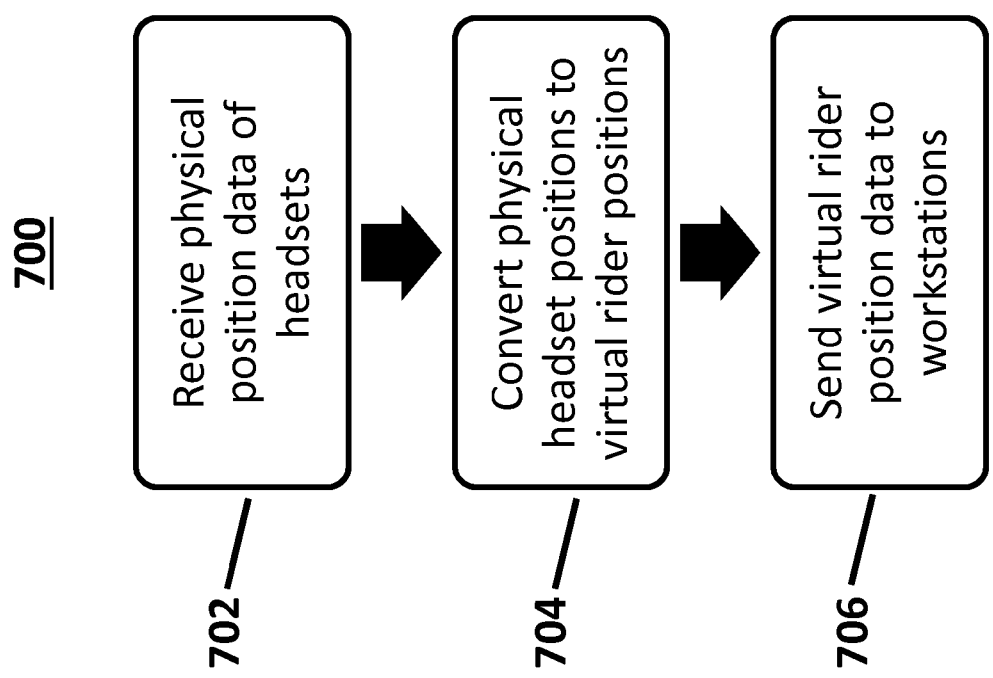
FIG. 7 depicts an exemplary process for operating a virtual reality ride system.

FIG. 7 depicts an exemplary process performed by the server 608 of the virtual reality ride system 600. In step 702, the server 608 receives physical position data of each headset 604 in virtual reality ride system 600 from the workstations 606. Physical position data may include, for example, the location (e.g., x, y, and z coordinates in a rectilinear frame) and orientation (e.g., heading, elevation, and bank or yaw, pitch, and roll) of the headsets 604. In step 704, the server 608 converts the physical position of the headsets 604 to a position in the virtual environment. The virtual position associated with the headset corresponds to the virtual position of the graphical representation of the rider wearing the headset 604. Next, in step 706, the virtual rider positions are sent to the individual workstations 606 to be used for rendering the animated virtual environment.

Figure 8:
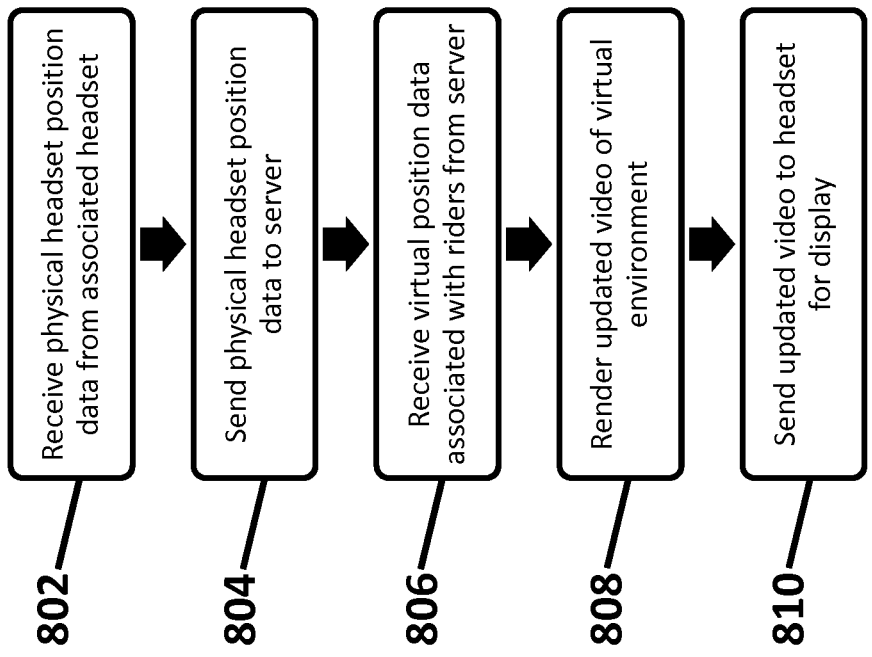
FIG. 8 depicts another exemplary process for operating a virtual reality ride system.

FIG. 8 depicts an exemplary process performed by a workstation 606 of the virtual reality ride system 600. In step 802, the workstation 606 receives physical position data of its associated headset 604. The physical headset position data is sent to the server 608 in step 804. As discussed above, the server 608 may collect physical headset position data from each workstation 606 and convert them into corresponding virtual positions. In step 806, the workstation 606 receives the virtual positions associated with the other riders from the server 608. In step 808, the virtual positions are used to render video of the virtual environment from the perspective of the rider, including graphical representations of the other riders based on their physical positions. In step 810, the rendered video is sent to the associated headset 604 for display to the rider.

Figure 9:
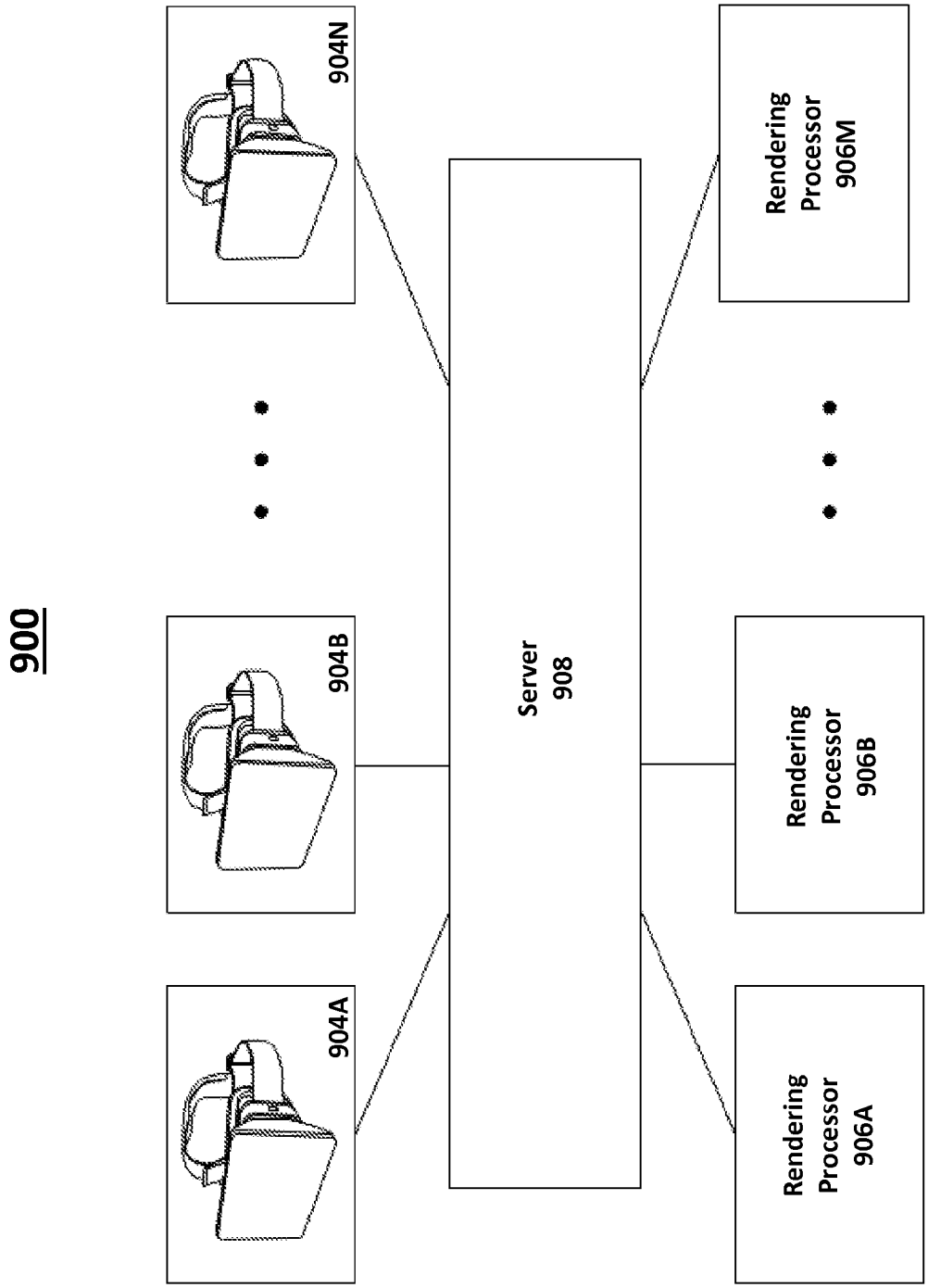
FIG. 9 depicts a block diagram of an embodiment of the virtual reality ride system.

In an alternative embodiment depicted in FIG. 9, headsets 904 may be connected directly to the server 908, which distributes the animation video render processing among several rendering processors 906. Unlike the workstations 606 in the architecture shown in FIG. 6, the number of rendering processors 906 does not necessarily equal the number of headsets 904 in the virtual ride system 900.

Figure 10:
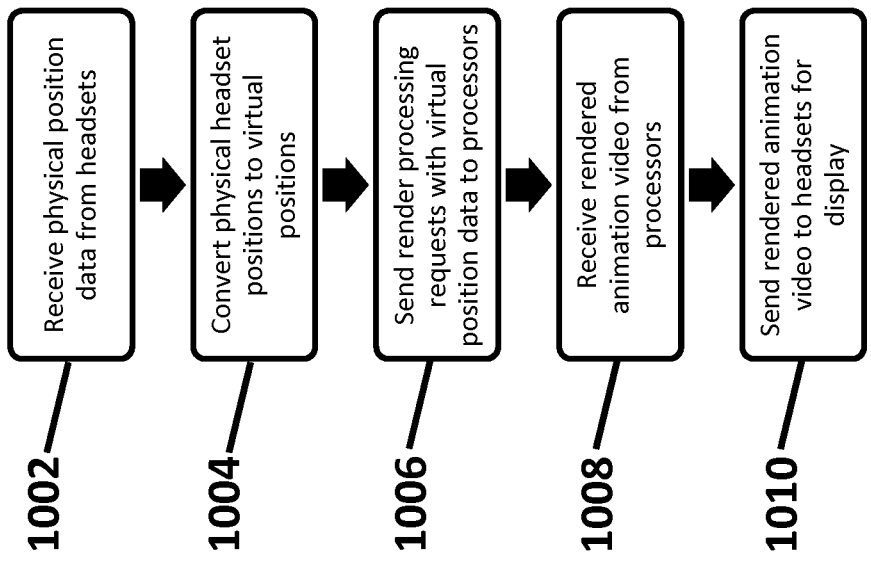
FIG. 10 depicts an exemplary process for operating a virtual reality ride system.

FIG. 10 depicts an exemplary process 1000 performed by the server 908 of the virtual reality ride system 900. In step 1002, the server 908 receives physical position data from headsets 904. In step 1004, the server 908 converts the physical headset position data from each headset 904 into corresponding virtual positions. In step 1006, the server 908 sends render processing requests to rendering processors. The render processing requests include the virtual position data associated with the headsets 904. In step 1008, the server receives the rendered animation video from the processors 906, and then sends the rendered animation video to the headsets 904 for display in step 1010.

Figure 11:
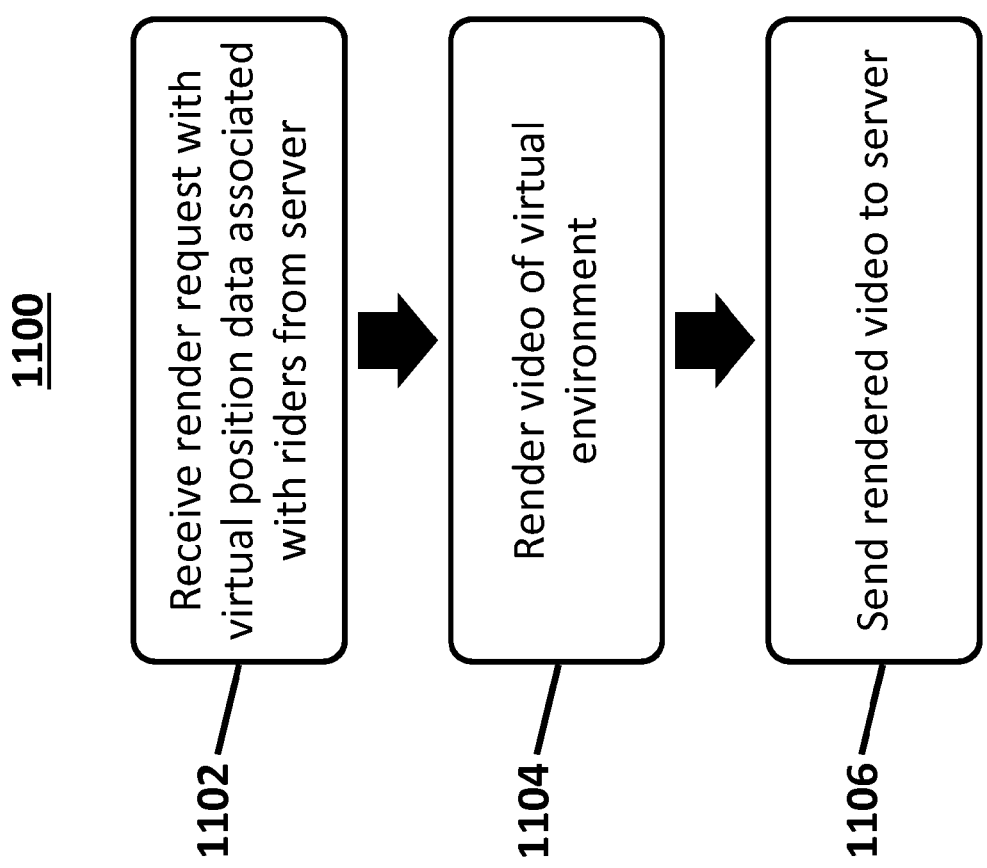
FIG. 11 depicts another exemplary process for operating a virtual reality ride system.

FIG. 11 depicts an exemplary process performed by a rendering processor 906 of the virtual reality ride system 900. In step 1102, the processor 906 receives a render request from the server 908. The render request may include virtual position data associated with the riders. In step 1104, the virtual positions are used to render video of the virtual environment from the perspective of a particular rider, including graphical representations of the other riders based on their physical positions. In step 1106, the rendered video is sent to the server 908.

Figure 12:
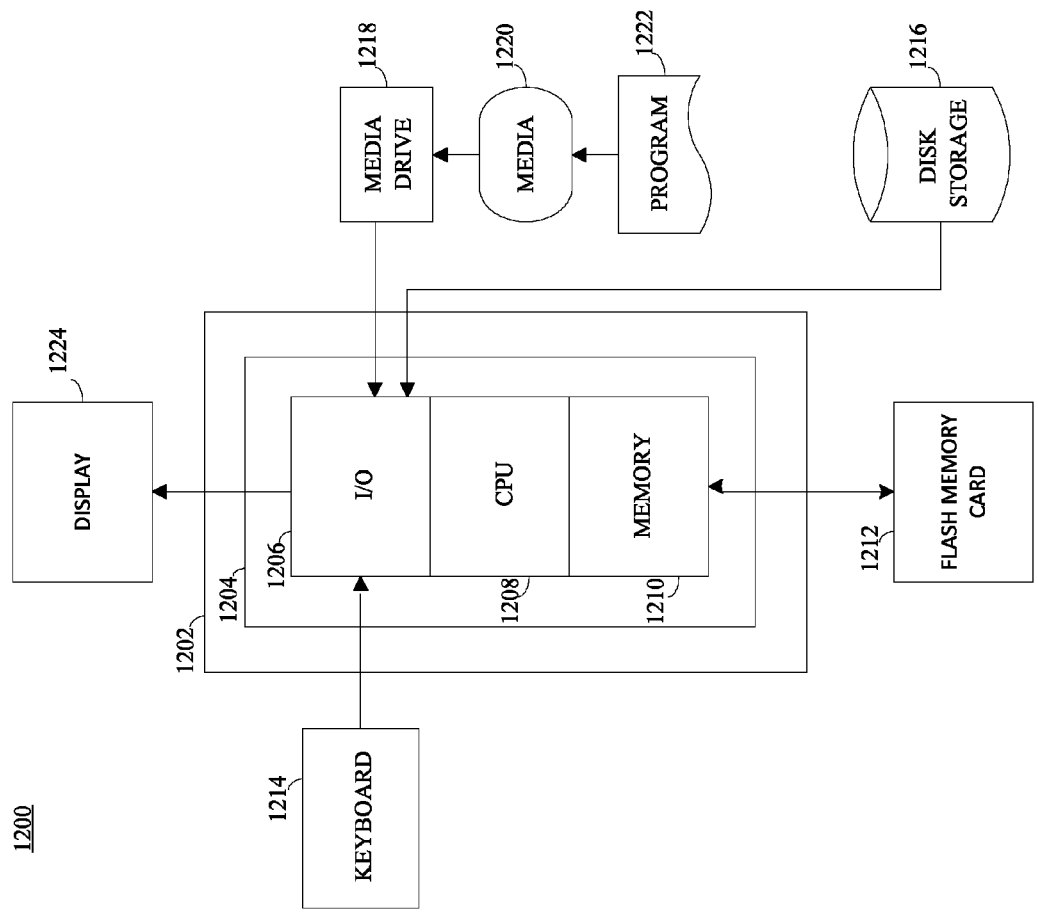
FIG. 12 depicts an exemplary computing system.

FIG. 12 depicts components of an exemplary computing system 1200 configured to perform any one of the above-described processes. In some embodiments, the workstations, rendering processors, and/or servers described above may include some or all of the elements of computing system 1200. Computing system 1200 may include, for example, a processor, memory, storage, and input/output devices (e.g., monitor, keyboard, stylus, drawing device, disk drive, Internet connection, etc.). However, computing system 1200 may include circuitry or other specialized hardware for carrying out some or all aspects of the processes. In some operational settings, computing system 1200 may be configured as a system that includes one or more units, each of which is configured to carry out some aspects of the processes either in software, hardware, or some combination thereof.

In computing system 1200, the main system 1202 may include a motherboard 1204 with a bus that connects an input/output ("I/O") section 1206, one or more central processing units ("CPU") 1208, and a memory section 1210, which may have a flash memory card 1212 related to it. Memory section 1210 may contain computer executable instructions and/or data for carrying out process 700, 800, 1000, and/or 1100. The I/O section 1206 may be connected to display 1224, a keyboard 1214, a disk storage unit 1216, and a media drive unit 1218. The media drive unit 1218 can read/write a non-transitory computer-readable storage medium 1220, which can contain programs 1222 and/or data.

At least some values based on the results of the above-described processes can be saved for subsequent use. Additionally, a non-transitory computer-readable storage medium can be used to store (e.g., tangibly embody) one or more computer programs for performing any one of the above-described processes by means of a computer. The computer program may be written, for example, in a general-purpose programming language (e.g., Pascal, C, C++, Java, or the like) or some specialized application-specific language.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

We claim:

1. A virtual reality ride system comprising:
   a platform comprising:
      at least one seat;
      a first headset having a first motion-sensing unit and a first display unit configured to display a first animated video of a virtual environment, the first headset being located at a first physical location within the platform and oriented in a first physical orientation; and
      a second headset having a second motion-sensing unit and second display unit configured to display a second animated video of the virtual environment, the second headset being located at a second physical location within the platform and oriented in a second physical orientation; and
   one or more rendering processors configured to render:
      the first animated video of the virtual environment from a first first-person perspective based on the first physical location and the first physical orientation, wherein:
         at least a portion of the first animated video changes in response to changes in the first physical location and the first physical orientation detected by the first motion-sensing unit of the first headset and changes in the second physical location and the second physical orientation detected by the second motion-sensing unit of the second headset; and
         at least a portion of the first animated video changes independently of changes in the first physical location and the first physical orientation detected by the first motion-sensing unit of the first headset and changes in the second physical location and the second physical orientation detected by the second motion-sensing unit of the second headset; and
      the second animated video of the virtual environment from a second first-person perspective based on the second physical location and the second physical orientation, wherein:
         at least a portion the second animated video changes in response to changes in the second physical location and the second physical orientation detected by the second motion-sensing unit of the second headset and changes in the first physical location and the first physical orientation detected by the first motion-sensing unit of the first headset; and
         at least a portion of the second animated video changes independently of changes in the second physical location and the second physical orientation detected by the second motion-sensing unit of the second headset and changes in the first physical location and the first physical orientation detected by the first motion-sensing unit of the first headset.

2. The virtual reality ride system of claim 1, wherein the first headset is associated with a virtual location in the virtual environment based on the first physical location of the first headset, and is associated with a virtual orientation in the virtual environment based on the first physical orientation of the first headset.

3. The virtual reality ride system of claim 2, wherein the first animated video provides the first first-person perspective of the virtual environment from the virtual location and in a direction based on the virtual orientation.

4. The virtual reality ride system of claim 1,
   wherein the first headset is associated with a graphical representation in the virtual environment, and
   wherein the graphical representation appears in the second animated video at a location based on the physical location of the first headset relative to the physical location of the second headset, and at least part of the graphical representation has an orientation based on the first physical orientation of the first headset.

5. The virtual reality ride system of claim 4, wherein the first motion-sensing unit senses translational motion.

6. The virtual reality ride system of claim 5, wherein the location of the graphical representation in the virtual environment changes when the first motion-sensing unit senses translational motion.

7. The virtual reality ride system of claim 4, wherein the first motion-sensing unit senses rotational motion.

8. The virtual reality ride system of claim 7, wherein the orientation of at least part of the graphical representation changes when the first motion-sensing unit senses rotational motion.

9. The virtual reality ride system of claim 1, wherein the seat is configured to move based on events occurring in the virtual environment.

10. A method of generating a virtual reality ride, the method comprising:
    at a platform comprising:
       at least one seat;
       a first headset having a first motion-sensing unit and a first display unit configured to display a first animated video of a virtual environment, the first headset being located at a first physical location within the platform and oriented in a first physical orientation;
       a second headset having a second motion-sensing unit and second display unit configured to display a second animated video of the virtual environment, the second headset being located at a second physical location within the platform and oriented in a second physical orientation; and
       one or more rendering processors;
    rendering, on the first headset using the one or more rendering processors, the first animated video of the virtual environment from a first first-person perspective based on a first physical location of a first headset and a first physical orientation of the first headset, wherein
       at least a portion of the first animated video changes in response to changes in the first physical location and the first physical orientation detected by the first motion-sensing unit of the first headset and changes in the second physical location and the second physical orientation detected by the second motion-sensing unit of the second headset; and
       at least a portion of the first animated video changes independently of changes in the first physical location and the first physical orientation detected by the first motion-sensing unit of the first headset and changes in the second physical location and the second physical orientation detected by the second motion-sensing unit of the second headset;
rendering, on the second headset using the one or more rendering processors, the second animated video of the virtual environment from a second first-person perspective based on a second physical location of a second headset and a second physical orientation of the second headset, wherein:
at least a portion the second animated video changes in response to changes in the second physical location and the second physical orientation detected by the second motion-sensing unit of the second headset and changes in the first physical location and the first physical orientation detected by the first motion-sensing unit of the first headset; and
at least a portion of the second animated video changes independently of changes in the second physical location and the second physical orientation detected by the second motion-sensing unit of the second headset and changes in the first physical location and the first physical orientation detected by the first motion-sensing unit of the first headset;
displaying the first animated video on the first display unit of the first headset; and
displaying the second animated video on the second display unit of the second headset.

11. The method of claim 10, wherein the first headset is associated with a virtual location in the virtual environment based on the first physical location of the first headset and is associated with a virtual orientation in the virtual environment based on the first physical orientation of the first headset.

12. The method of claim 11, wherein the first animated video provides the first first-person perspective of the virtual environment from the virtual location and in a direction based on the virtual orientation.

13. The method of claim 11,
wherein the first headset is associated with a graphical representation in the virtual environment, and
wherein the graphical representation appears in the second animated video at a location based on the physical location of the first headset relative to the physical location of the second headset, and at least part of the graphical representation has an orientation based on the first physical orientation of the first headset.

14. The method of claim 13, wherein the location of the graphical representation in the virtual environment changes when a motion-sensing unit included in the first headset senses translational motion.

15. The method of claim 13, wherein the orientation of at least part of the graphical representation changes when a motion-sensing unit included in the first headset senses rotational motion.

16. The method of claim 10, further comprising:
moving a seat based on events occurring in the virtual environment.

17. A non-transitory computer-readable storage medium comprising computer-executable instructions for generating a virtual reality ride, the computer-executable instructions comprising instructions for:
at a platform comprising:
at least one seat;
a first headset having a first motion-sensing unit and a first display unit configured to display a first animated video of a virtual environment, the first headset being located at a first physical location within the platform and oriented in a first physical orientation;
a second headset having a second motion-sensing unit and second display unit configured to display a second animated video of the virtual environment, the second headset being located at a second physical location within the platform and oriented in a second physical orientation; and
one or more rendering processors;
rendering, on the first headset using the one or more rendering processors, the first animated video of the virtual environment from a first first-person perspective based on a first physical location of a first headset and a first physical orientation of the first headset, wherein:
at least a portion of the first animated video changes in response to changes in the first physical location and the first physical orientation detected by the first motion-sensing unit of the first headset and changes in the second physical location and the second physical orientation detected by the second motion-sensing unit of the second headset; and
at least a portion of the first animated video changes independently of changes in the first physical location and the first physical orientation detected by the first motion-sensing unit of the first headset and changes in the second physical location and the second physical orientation detected by the second motion-sensing unit of the second headset;
rendering, on the second headset using the one or more rendering processors, the second animated video of the virtual environment from a second first-person perspective based on a second physical location of a second headset and a second physical orientation of the second headset, wherein:
at least a portion the second animated video changes in response to changes in the second physical location and the second physical orientation detected by the second motion-sensing unit of the second headset and changes in the first physical location and the first physical orientation detected by the first motion-sensing unit of the first headset; and
at least a portion of the second animated video changes independently of changes in the second physical location and the second physical orientation detected by the second motion-sensing unit of the second headset and changes in the first physical location and the first physical orientation detected by the first motion-sensing unit of the first headset;
displaying the first animated video on the first display unit of the first headset; and
displaying the second animated video on the second display unit of the second headset.

18. The non-transitory computer-readable storage medium of claim 17, wherein the first headset is associated with a virtual location in the virtual environment based on the first physical location of the first headset and is associated with a virtual orientation in the virtual environment based on the first physical orientation of the first headset.

19. The non-transitory computer-readable storage medium of claim 18, wherein the first animated video provides the first first-person perspective of the virtual environment from the virtual location and in a direction based on the virtual orientation.

20. The non-transitory computer-readable storage medium of claim 18, wherein the first headset is associated with a graphical representation in the virtual environment, and wherein the graphical representation appears in the second animated video at a location based on the physical location of the first headset relative to the physical location of the second headset, and at least part of the graphical representation has an orientation based on the first physical orientation of the first headset.

21. The non-transitory computer-readable storage medium of claim 20, wherein the location of the graphical representation in the virtual environment changes when a motion-sensing unit included in the first headset senses translational motion.

22. The non-transitory computer-readable storage medium of claim 20, wherein the orientation of at least part of the graphical representation changes when a motion-sensing unit included in the first headset senses rotational motion.

23. The non-transitory computer-readable storage medium of claim 17, further comprising instructions for:
    moving a seat based on events occurring in the virtual environment.

* * * * *